United States Patent
Lee et al.

(10) Patent No.: US 6,683,894 B1
(45) Date of Patent: Jan. 27, 2004

(54) TUNABLE IR LASER SOURCE FOR MALDI

(75) Inventors: Hyo Sang Lee, Silver Spring, MD (US); Coorg R. Prasad, Silver Spring, MD (US); Jun Zhang, Ellicott City, MD (US)

(73) Assignee: Science & Engineering Services, Inc., Burtonsville, MD (US)

( * ) Notice: Subject to any disclaimer, the term of this patent is extended or adjusted under 35 U.S.C. 154(b) by 0 days.

(21) Appl. No.: 09/552,579

(22) Filed: Apr. 19, 2000

(51) Int. Cl.$^7$ .............................. H01S 3/10; H01S 3/11; H01S 3/13; H01S 3/08
(52) U.S. Cl. ................ 372/20; 372/21; 372/22; 372/10; 372/30; 372/101; 372/105
(58) Field of Search .................. 372/20, 21, 22, 372/30, 10, 75, 105, 101, 70

(56) References Cited

U.S. PATENT DOCUMENTS

| | | | |
|---|---|---|---|
| 3,662,183 A | | 5/1972 | Ashkin et al. |
| 4,872,177 A | * | 10/1989 | Baer et al. ..................... 372/75 |
| 5,053,641 A | | 10/1991 | Cheng et al. |
| 5,134,622 A | | 7/1992 | Deacon |
| 5,341,389 A | * | 8/1994 | Payne et al. ................... 372/41 |
| 5,373,160 A | * | 12/1994 | Taylor ..................... 250/338.5 |
| 5,579,152 A | | 11/1996 | Ellingson et al. |
| 5,606,453 A | | 2/1997 | Walling et al. |
| 5,889,490 A | | 3/1999 | Wachter et al. |
| 5,912,910 A | * | 6/1999 | Sanders et al. ................ 372/22 |
| 5,914,776 A | | 6/1999 | Streicher |
| 5,940,419 A | * | 8/1999 | Xie ............................... 372/22 |
| 6,044,096 A | * | 3/2000 | Wolak et al. .................. 372/36 |

OTHER PUBLICATIONS

Sadeghi et al, Compact tunable Cr:LiSAF laser for infrared matrix–assisted laser desorption/ionization, Rapid communication in mass spectrometry, vol. 11, 1997, pp. 393–397.*

Fromzel et al, Diode–array–pumped, tunable, TEM, Q–switched Cr:LiSAF laser, science and engineering services, paper WDD23, 1998.*

Giessen, Advanced tunability and high–power TEM operation of the YB:YAG, OSA TOPS, vol. 10, pp. 280–284, Advanced Solid State Lasers, 1997.*

Karas, Hillenkamp, *Laser Desorption Ionization of Proteins with Molecular Masses Exceeding 10,000 Daltons*; F. Anal. Chem.; 60, pp. 2299–2301; (1988).*

Nordhoff, Kirpekar, Karas, Cramer, Hahner, Hillenkamp, Kristiansen, Roepstorff, Lazius; *Comparison of IR–and UV–matrix–assisted Laser Desorption/Ionization Mass Spectrometry of Oligodeoxynucleotides*; Nucleic Acids Research; vol. 22; No. 13; pp. 2460–2465; (1994).*

(List continued on next page.)

*Primary Examiner*—Paul Ip
*Assistant Examiner*—Armando Rodriguez
(74) *Attorney, Agent, or Firm*—Oblon, Spivak, McClelland, Maier & Neustadt, P.C.

(57) ABSTRACT

A diode pumped solid state laser/OPO system widely tunable in mid infrared spectrum for infrared matrix assisted laser desorption/ionization (MALDI) mass spectroscopy is disclosed. Up to a few tens of milli-Joule, short pulse, tunable near infrared laser pulse is generated from an all solid state laser at a high pulse repetition rate up to one kHz. The tunable near-infrared laser pumps a Quasi-Phase Matching (QPM) OPO system to further shift the wavelength to the mid-IR range and to broaden the tuning range to as much as 3 $\mu$m to effectively generate a widely tunable spectral output. The wide range tuning of the infrared output is accomplished by a narrow range tuning of the pump laser. The pump laser output is generated by a diode pumped tunable solid state laser module using either a Yb:YAG crystal or any other efficient tunable laser crystals. The wavelength range (2–5 $\mu$m) covered by the solid state laser system is optimum for MALDI applications. This wavelength range is especially beneficial for large mass DNA analysis. A light detection and ranging system is also disclosed.

5 Claims, 8 Drawing Sheets

OTHER PUBLICATIONS

Siegel, Tabei, Kunz, Hollander, Hamann, Bell, Berkenkamp, and Hillenkamp; *Calicheamicin Derivatives Conjugated to Monoclonal Antibodies: Determination of Loading Values and Distributions by Infrared and UV Matrix–Assisted Laser Desorption/Ionization Mass Spectrometry and Electrospray Ionization Mass Spectrometry*; Analytical Chemistry; vol. 69; No. 14; pp. 2716–2726; (1997).*

Cramer, Rainer, Haglund, Hillenkamp, Franz; *Wavelength and Pulse Length Dependence of IR–MALDI Processes*; 1996 Conference of the American Society of Mass Spectrometry; and Allied Topics; Portland, OR, ASMS, Santa Fe; (May 12–16, 1996).*

Niu, Zhang, Chait; *Direct Comparison of Infrared and Ultraviolet Wavelength Matrix–Assisted Laser Desorption/Ionization Mass Spectrometry of Proteins*; Journal of American Society of Mass Spectrometry; 9; pp. 1–7; (1998).*

Sadeghi, Olurmee, Tang, Vertes, Jiang, Henderson, Lee, Prasad; *Compact Tunable Cr:LiSAF Laser for Infrared Matrix–assisted Laser Desorption/Ionization*; Rapid Comm. in Mass Spectrometry; vol. 11; pp. 393–397; (1997).*

Nordhoff, Cramer, Karas, Hillenkamp, Kirpekar, Kristiansen, Roepstorff; *Ion Stability of Nucleic Acids in Infrared Matrix–Assisted Laser Desorption/Ionization Mass Spectrometry*; Nucleic Acids Research; vol. 21; No. 15; pp. 3347–3357; (1993).*

Murray, Caldwell; *Matrix Assisted Laser Desorption Ionization with a Tunable Mid–Infrared Optical Parametric Oscillator*; Proceedings of the 45$^{th}$ ASMS Conference on Mass Spectrometry and Allied Topics; (1997).*

Costello, Nordhoff, Hillenkamp; *Matrix–Assisted UV and IR Laser Desorption–Ionization Time–of–Flight Mass Spectrometry of Diamminoplatinum (II) Oligodeoxyribonucleotide Adducts and Their Unplatinated Analogs*; International Journal of Mass Spectrometry and Ion Processes, 132, pp. 239–249; (1994).*

Srinivasan, Liu, Venta, Siemieniak, Killeen; Zhu, Lubman; *Matrix–Assisted Laser Desorption/Ionization Time–ofFlight Mass Spectrometry as a Rapid Screening Method to Detect Mutations Causing Tay–Sachs Disease*; Rapid Communications in Mass Spectrometry; vol. 11, pp. 1144–1150; (1997).*

Hess, Park, Haglund; *IR MALDI of Low Molecular Weight Compounds Using a Free Electron Laser*; Proceedings of the 45$^{th}$ ASMS Conference on Mass Spectrometry and Allied Topics; (1997).*

Jiang, Henderson, Prasad, Lee; Science and Engineering Services, Inc., Maryland; and; Sadeghi, Olumee, Tang, Vertes; Dept. of Chemistry, George Washington University, Washington, D.C.; *Widely Tunable Laser for MALDI Analysis of Biomolecules*; Proceedings of the 45$^{th}$ ASMS Conference on Mass Spectrometry and Allied Topics; (1997).

Terry, Cui, Yang, Sibbett, Dunn; *Low–Threshold Operation of an All–Solid–State KTP Optical Prametric Oscillator*; Journal Optical Society of America B; vol. 11; No. 5; pp. 758–769; (May 1994).

Loicono, Loiacono, Zola, Stolzenberger, McGee, Norwood; *Optical Properties and Ionic Conductivity of KtiOAsO$_4$ Crystals*: American Institute of Physics; Appl. Phys. Lett. 61(8); pp. 895–897; (Aug. 24, 1992).

Fejer, Magel, Jundt, Byer; *Quasi–Phase–Matched Second Harmonic Generation: Tuning and Tolerances*; IEEE Journal of Quantum Electronics; vol. 28; No. 11; pp. 2631–2651; (Nov. 1992).

Myers, Eckhardt, Fejer, Byer; *Quasi–Phase–Matched Optical Parametric Oscillators in Bulk Periodically Poled LiNbO$_3$*; Journal Optical Society of America; B/Vol. 12; No. 11; pp. 2102–2116; (Nov. 1995).

Bibeau, Beach, Mitchell, Emanuel, Skidmore, Ebbers, Sutton, Jancaitis; *High–Average–Power 1–µm Performance and Frequency Conversion of a Diode–End–Pumped Yb:YAG Laser*; IEEE Journal of Quantum Electronics; vol. 34; No. 10; pp. 2010–2019; (Oct. 1998).

Giesen, Brauch, Johannsen, Karszewski, Schiegg, Stewen, Voss; *Advanced Tunability and High–Power TEM$_{(x)}$—Operation of the Yb:YAG Thin Disc Laser*; OSA Tops; vol. 10 Advanced Solid State Lasers; pp. 280–284; (1997).

Karszewski, Brauch, Contag, Erhard, Giesen, Johannsen, Stewen, Voss; *100 W TEM$_{(x)}$ Operation of Yb:YAG Thin Disc Laser with High Efficiency*; OSA Tops; vol. 19; Advanced Solid State Lasers; Optical Society of America; pp. 296–299, (1998).

Kim, Mead, Pierce, Bowers, Kulesa, Skidmore, Freitas, Barnes; *High Energy Diode–Pumped, Q–Switched Cr:LiSAF Laser*; OSA TOPS; vol. 19; Advanced Solid State Lasers; Optical Society of America; pp. 101–104, (1998).

Fromzel, Prasad, Zhang; Science and Engineering Services, Inc., Burtonsville, Maryland; *Diode–Array–Pumped, Tunable, TEM$_{(x)}$ Q–Switched Cr:LiSAF Laser*; 14$^{th}$ Interdisciplinary Laser Science Conference; paper WDD23; (1998).

Brosnan, Byer; *Optical Parametric Oscillator Threshold and Linewidth Studies*; IEEE Journal of Quantum Electronics; vol. QE–15; No. 6; pp. 415–431; (Jun. 1979).

Bruesselbach, Sumida, Reeder, Byren; *High–Power Side–Diode–Pumped YB:YAG Laser*; OSA TOPS; vol. 10; Advanced Solid State Lasers; Optical Society of America; pp. 285–287, (1997).

Cramer; Burlingame; *Employing Target Modifications for the Investigation of Liquid Infrared Matrix–Assisted Laser Desorption/Ionization Mass Spectrometry*; Rapid Communications in Mass Spectrometry; 14; pp. 53–60; (2000).

Zhang, Niu, Chait; *Exploring Infrared Wavelength Matrix–Assisted Laser Desorption/Ionization of Proteins with Delayed–Extraction Time–of–Flight Mass Spectrometry*; American Society for Mass Spectrometry; pp. 879–884; (1998).

Myers, Eckardt, Fejer, Byer, Bosenberg, *Multigrating Quasi–Phase–Matched Optical Parametric Oscillator in Periodically Poled LiNbO$_3$*; Optical Society of America; vol. 21; No. 8; Optics Letters; pp. 591–593; (Apr. 15, 1996).

Cordwell, Wasinger, Cerpa–Poljak, Duncan, Humphrey-Smith; *Conserved Motifs as the Basis for Recognition of Homologous Proteins Across Species Boundaries Using Peptide–mass Fingerprinting*; Journal of Mass Spectrometry; vol. 32; pp. 370–378; (1997).

Haglund, Tang, Hillenkamp, Chen; *Matrix–Assisted Laser-Desorption Mass Spectrometry of DNA Using an Infrared Free–Electron Laser*; Proceedings SPIE–International Society of Optical Engineering; vol. 1854; pp. 117–128 (1993).

Cramer; Hillenkamp; Haglund; *Infrared Matrix–Assisted Laser Desorption and Ionization by Using a Tunable Mid–Infrared Free–Electron Laser*; Journal of The American Society for Mass Spectrometry, vol. 7, No. 12, pp. 1187–1193; (1996).

VanBreeman; Snow; Cotter; *Time–Resolved Laser Desorption Mass Spectrometry. I. Desorption of Preformed Ions*; International Journal of Mass Spectrometry/Ion Processes; 49; 3/10; pp. 35–50; (1983).

* cited by examiner

TUNABLE IR LASER SOURCE FOR MALDI

This invention was made with Government support under the contracts F29601-98-C-0105 and MDA 972-98-C-0012 awarded by the Air Force Research Laboratory Department of The Air Force and Defense Advanced Research Projects Agency (DARPA), respectively. The government has certain rights in the invention.

BACKGROUND OF THE INVENTION

1. Field of the Invention

This invention relates to a tunable solid state laser system designed for matrix-assisted laser desorption/ionization (MALDI) applications, for example, large bio-molecules and DNA analysis.

2. Discussion of the Background

Mass spectrometric (MS) analysis of large biologically important molecules has made significant advances over the past several years. Increasingly, mild desorption methods have made possible the analysis of progressively larger macromolecules with minimal fragmentation, allowing the analysis of complex biological mixtures. Matrix-assisted laser desorption/ionization mass spectrometry (MALDI-MS) was first introduced by Karas, M.; Hillenkamp, F. Anal. Chem. 1988, 60, 2299, the entire content of which is hereby incorporated by reference.

MALDI-MS is now increasingly applied to the study of peptides, proteins and other bio-molecules for amino acid sequencing, structural analysis, modifications and non-covalent interactions. In comparison to the rapid development of MALDI for peptide and protein analysis, MALDI work on nucleic acids has been somewhat slower. This is due, in part, to the polyelectrolytic nature of nucleic acids, which combines well with most matrices and requires a relatively large deposition of energy to affect desorption of the macro molecules with an attendant risk of increased fragmentation. Recently, considerable attention has been directed to overcome these difficulties because of the great benefits which reliable, routine mass spectrometric techniques would offer in the field of molecular biology, and especially in the areas of gene analysis, identity testing, forensics, diagnosis of genetic disorders, and DNA sequencing.

Although MALDI-MS holds great potential for the analysis of DNA fragments with increased throughput and minimum sample degradation, it is presently limited mainly by the low ionization efficiency and fragmentation problems. MALDI-MS is further limited by the restricted selection of matrices that are accessible with fixed wavelength lasers.

Many of these limitations are a consequence of the current reliance on ultra violet (UV) lasers such as Nitrogen (337 nm), or frequency tripled, or quadrupled Nd:YAG (355 nm or 266 nm) lasers for MALDI. Although hundreds of potential matrix materials exist, only a limited number of useful matrices (approximately 30) are suitable for use with the conventional fixed wavelength lasers. The most successful matrix materials for nucleic acids in the UV range are picolinic acid and its derivatives, whereas succinic acid works well in the near IR region as demonstrated by Nordhoff et al, Nucl. Acids Res. 1994, 22, 2460, the entire content of which is hereby incorporated by reference. On the other hand, infrared IR laser sources can overcome the difficulties of molecular fragmentation, and also permit the use of a wide variety of laser desorption matrices, as shown by Cramer et al, J. Am. Soc. Mass Spectrom. 1996, 7, 1187, the entire content of which is hereby incorporated by reference. In studies, the IR MALDI resolution was found to be higher, and the sample molecules were stable during IR radiation, while the stability of the same sample molecules degraded under UV radiation. See Siegel et al, Anal. Chem. 1997, 69, 2716–2726, the entire content of which is hereby incorporated by reference.

$CO_2$ (10.6 $\mu$m) lasers have been used effectively since 1983 for laser desorption studies. Both fixed wavelength lasers such as Er:YAG (2.94 $\mu$m) and $CO_2$ and tunable sources such as free electron lasers (typically 2.2 to 7.0 $\mu$m) and very recently tunable (2 to 3.5 $\mu$m) Optical Parametric Oscillators (OPO) including Cr:LiSAF pumped KTA OPO have been utilized in a limited number of IR MALDI experiments. However, the high cost along with the complexity and size of these IR lasers, especially the free-electron lasers, have historically limited the use of IR lasers to only a few selected research groups. Furthermore, the commonly used OPO pumped by a Nd:YAG laser, which can generate IR output in the 2.7–3.2 $\mu$m wavelength range, is cumbersome, expensive and requires expertise to operate and are thus mainly suitable for research facilities.

An examination of the literature reveals that the IR MALDI technique is not nearly as mature as the UV MALDI, and a great deal of work remains to be done before its full potential is realized. For example, the mass resolution obtained using a conventional IR-MALDI system is less than satisfying. Also, the influence of sample preparation and laser wavelength on the resulting mass spectra is significant.

Most time-of-flight (TOF) mass spectrometers are large, expensive instruments requiring considerable expenditure of time and personnel for their routine operation. This expense and expenditure has motivated the development of miniaturized, low cost TOF mass spectrometers that could have sufficient sensitivity and resolution to be utilized for all the comparative sequencing applications mentioned earlier. Taking advantage of the high time-resolution of current digitizers and using reflectrons to improve mass resolution, a miniature endcap TOF MS was recently demonstrated as being capable of providing structural information for biological molecules. See Cornish et al, in Proceedings of the 45$^{th}$ ASMS Conference on Mass Spectrometry and Allied Topics, 1997, the entire content of which is hereby incorporated by reference.

SUMMARY OF THE INVENTION

Although, in general, detection of oligomers with approximately 30 nucleotide bases (primers plus extensions) is required for most of the hybridization schemes that are being considered now, one object of the present invention is to permit facile, high sensitivity detection and resolution of oligomers up to 100-mer. The latter is indeed difficult utilizing current UV laser-based MALDI instruments, but utilization of the IR laser at optimal wavelengths as provided by the present invention is expected to greatly improve the signal to noise ratio in that range.

Thus, a widely tunable, compact, solid state IR (infrared) laser source covering a wide range of wavelengths from 2 to 5 $\mu$m is critically needed for MALDI applications in order to expand the capabilities of MALDI MS to the range of IR wavelengths, where a large number of potential matrices exist.

Accordingly, one object of this invention is to provide an innovative, variable IR wavelength, miniaturized laser system to be used with a mass spectrometer, for example, a miniaturized endcap reflectron time-of-flight mass spectrometer (wich corresponds to a special mass spectrometer design known to those skilled in the art). The present invention provides higher sensitivity, higher resolution and higher mass accuracy measurements in MALDI applications. In addition, the laser system of the present invention furnishes the ability to select new amenable matrices and ultimately can provide analytical capabilities on a compact, user friendly, and inexpensive instrument that can be utilized in a variety of analytical, medical, environmental, and forensic settings. The laser system can also be applied to other MALDI configurations that include, general time of flight MS and ion trap MS.

Another object of the present invention is to provide a tunable infrared laser system that provides an infrared laser wavelength at 2–5 $\mu$m range with a pulse energy up to a few mJ, thus providing a desorption and ionization source for the MALDI mass spectrometers.

Another object of the present invention is to provide an infrared laser system including a tunable diode pumped solid state (DPSS) laser and associated quasi-phase matched optical parametric oscillator (QPM OPO) or other nonlinear crystal, whereby a wide tuning is accomplished by tuning the pump laser frequencies without resetting the OPO crystal parameters.

Another object of the invention is to provide a tunable DPSS laser system based on Yb:YAG crystal which is effectively pumped by a semiconductor diode laser array(s) through an end-pumping or a side-pumping geometry to provide high quality beam laser pulses for pumping the OPO to generate stable IR laser pulses.

Another object of the invention is to provide a technique to convert the pump laser wavelength to an infrared wavelength by using a quasi-phase-matching nonlinear optical material such as PPLN, PPRTA, or other infrared laser material.

Another object of the invention is to provide a small, diode-pumped widely tunable, high repetition rate, laser source which is critically needed for a robust low cost IR-MALDI-MS instrument.

It is yet another object of the invention to provide interface optics designed for, and a method of, delivering the infrared laser pulse to the bio-sample inside the MS with an optimum efficiency and focusing for the maximum energy density at an optimum (controllable) size for best ionization efficiency and sensitivity of the MALDI/MS.

Another object of the present invention is to provide a novel Light Detection And Ranging (LIDAR) system including a novel infrared laser system.

These and other objects are achieved according to the present invention by providing a laser system and methods which integrate a DPSS tunable laser and OPO in a compact system, thereby generating an intermediate energy tunable near infrared laser pulse using a Yb:YAG laser crystal, tuning the output wavelength using a birefringent tuner BRT in a laser cavity, pumping the OPO with the output of this laser cavity to convert from a wavelength in the near infrared to a wavelength in the infrared region, and amplifying the tuning range by the OPO cavity from 2–5 $\mu$m without angular rotation or temperature tuning of the OPO crystal. Output from the laser system can be focused onto samples for MALDI-MS analysis.

The entire laser system is integrated into a compact package, has low power consumption through an efficient diode pumping design, and provides stable laser output due to the reduced thermal loading of the laser system. This configuration consequently provides a long lifetime for the laser operation and robust performance that does not require intense maintenance and highly skilled operators.

The output of the above described laser/OPO system provides medium pulse energy, up to a few mJ, for example, 1–10 mJ, with relatively short pulses (up to 40 nsec) at a relatively high pulse repetition frequency PRF, for example, 2–100 Hz, or up to 1 kHz, if required. The compact design and low thermal dissipation from the efficient diode pumping design combined with the robust optomechanical design provides a high level of laser energy output stability (less than 3% fluctuation), which is a desirable feature for MALDI applications to assure high sensitivity and resolution. The output laser beam produces a well defined Gaussian profile which enables tight focusing at the sample location in the MS. The threshold for MALDI ionization is thus significantly reduced and sample consumption is minimized for economic sample analysis and improving the sensitivity. Combining the flexibility of focusing of the Gaussian laser beam with the wavelength tunability in the infrared region, this system provides a unique feature for MALDI analysis of large mass biomolecules including DNA and RNA, which has not been previously possible.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
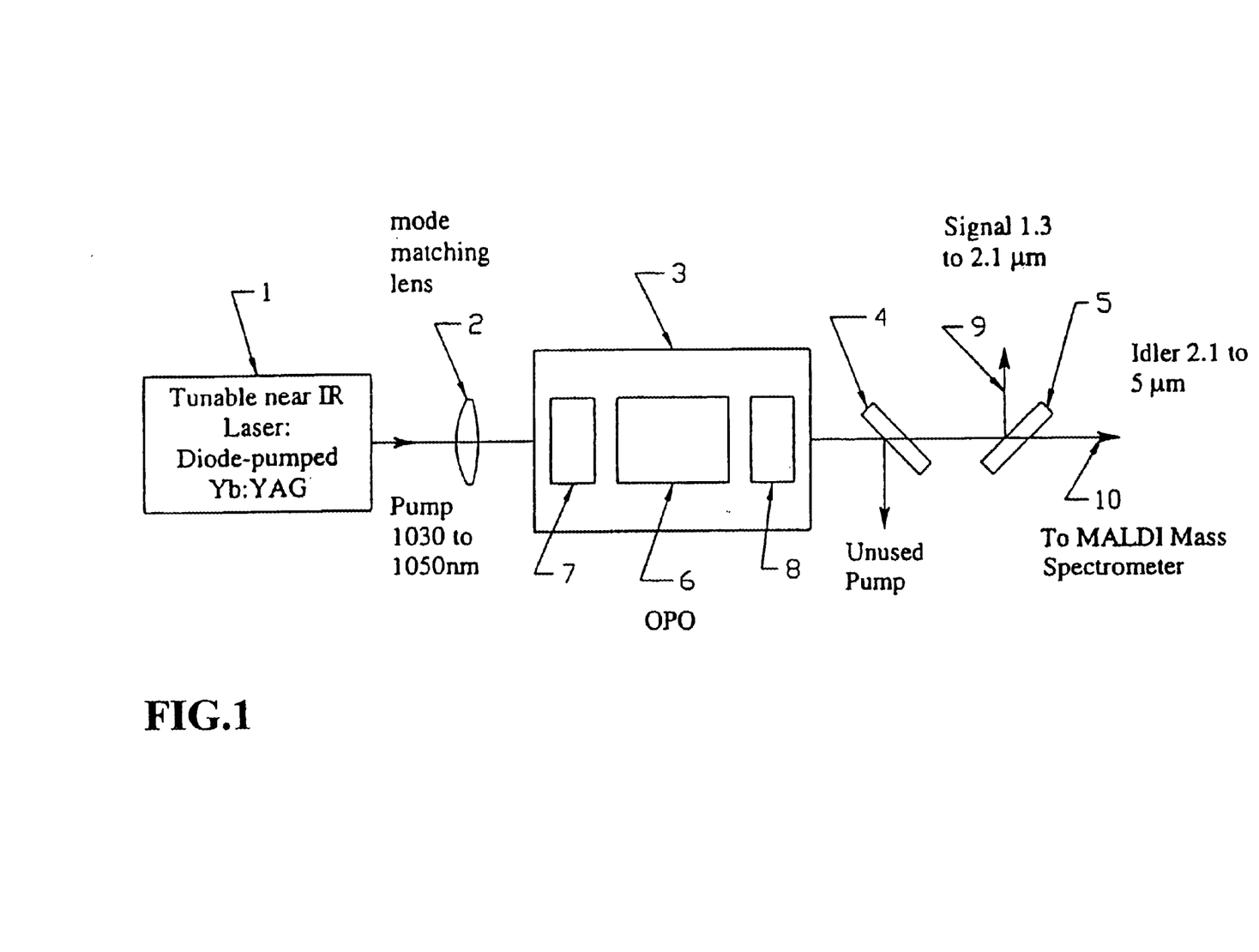
FIG. 1 is a schematic illustration of a tuned IR laser/OPO system employing a tunable diode-pumped Yb:YAG laser and a QPM OPO, wherein widely mid-IR output is achieved.

Referring now to the drawings, wherein like reference numerals designate identical or corresponding parts throughout the several views, and more particularly to FIG. 1 showing a schematic of a compact laser system that can be tuned rapidly over a wide mid-infrared wavelength range covering 2 to 5 $\mu$m. The laser system includes a diode pumped solid state (DPSS) tunable Yb:YAG laser 1, a mode matching lens 2 configured to mode match the pumping beam from the laser 1, and a simple, fixed, quasi-phase matched optical parametric oscillator (QPM OPO) 3 pumped by laser 1. A QPM OPO 3 is a nonlinear frequency conversion device which converts input pump photons into two photons of lesser energy through the parametric generation process in a nonlinear crystal 6. The input pump wave with a frequency $\omega_P$ generates two waves, i.e., a signal wave 9 and an idler wave 10 with frequencies $\omega_S$ and $\omega_I$, respectively, subject to the energy conservation condition, $\omega_P = \omega_I + \omega_S$. The QPM-OPO includes two mirrors 7 and 8 forming a cavity. The output waves of OPO 3 can be separated using beam splitters 4 and 5. The tuning properties of the material are dependent upon the further condition of phase or momentum-matching, $k_P = k_S + k_I$, where the momentum is $k = n\omega/c$, with n is the refractive index, $\omega$ is a frequency, and c is the speed of light. Tuning is thus dependent upon the refractive indices at the three wavelengths. Subject to these criteria, the most practical pump sources for the generation of tunable 2.5 to 5.5 $\mu$m radiation are lasers operating in the 700 nm to 1.1 $\mu$m region.

1. Compact Widely Tunable Infrared Laser/OPO Source

Conventionally, an OPO is pumped by a fixed wavelength source, such as a Nd:YAG laser operating at 1.06 $\mu$m. In such an OPO, birefringent phase-matching is utilized, and the output wavelengths are controlled by angle or temperature tuning of the refractive indices of the OPO. These tuning techniques have several limitations. Limitations of tuning by angle are: restricted angular acceptance, beam walk-off which limits the interaction length, and beam deviation which complicates alignment. Tuning by temperature is again limited to reasonable temperature ranges, and tuning is slow to allow for thermal stabilization. In addition, birefringent phase-matching constrains the interaction to involve only one wave polarized orthogonally to the other two and hence cannot operate with large diagonal components of nonlinear susceptibility.

Contrary to this conventional approach, wherein the wavelength of the pump laser is fixed, the present invention utilizes a quasi-phase matched material optical parametric oscillator (QPM-OPO) cavity interfaced with a tunable diode pumped solid state (DPSS) laser. The tunable DPSS laser 1 utilizes an electronically controlled birefringent controller 18 (See FIG. 2). The birefringent controller, or birefringent tuner, 18 is a fast tuning device. As an example of a birefringent controller 18, a birefringent filter (quartz plate) is mounted on a mechanical rotator driven by a motor which is controlled by a controller (for example, a Motorized linear translation stage from National Aperture, Inc.). The built in encoder device recognizes the position of the stage and thus the precise rotation position of the quartz plate. The rotation of the quartz plate changes the optical axis inside the laser cavity and thus varies the birefringence within the laser cavity. The plate rotation can be controlled by control pad, or by computer control so as to effectively control or tune the laser.

The tunable laser pumps an optical parametric oscillator which produces a signal wave and an idler wave having wide ranges of wavelengths due to the variable frequency input from the tunable laser. The use of a broadly tunable pump laser to generate mid-infrared provides several distinct advantages to the overall system, some of which are:

1) very simple geometry for the OPO and the entire laser system;
2) rapid tuning of the OPO by pump wavelength tuning;
3) widest range of output wavelengths for accessing several of the absorption bands of the constituents of the matrix and samples including O—H bond at 2.94 $\mu$m, and C—H and N—H bonds at near 3.4 $\mu$m, and others.

Thus, pump wavelength tuning allows wide continuous spectral coverage and frequency agility without requiring adjustment of the OPO or realignment of the system, which is required with a fixed wavelength pump laser. Pump wavelength tuning allows high repetition rate and medium energy in tunable compact DPSS pumped OPO systems.

2. Materials for the QPM-OPO

To meet the need for a high repetition rate, mid-infrared source, several nonlinear materials have been examined which might potentially be used in an OPO. Factors to consider for selecting the materials are:

1) Transmission and phase-matching in the near to mid-infrared;
2) capability to tolerate tight pump beam focusing;
3) potential for low energy oscillation threshold; and
4) sufficient damage threshold.

Some commercially available crystals which meet these conditions to at least some extent are the following:

1) KTP or $KTiOPO_4$, Potassium Titanyl Phosphate;
2) the Arsenate group of crystals KTA or $KTiOAsO_4$, Potassium Titanyl Arsenate; RTA or $RbTiOAsO_4$, Rubidium Titanyl Arsenate; CTA, or $CsTiOAsO_4$, Cesium Titanyl Arsenate; and
3) periodically-poled crystals $LiNbO_3$ (Periodically Poled Lithium Niobate or PPLN), RTA (PPRTA) and KTP (PPKTP).

KTP suffers from the drawback of significant absorption beyond 4.5 $\mu$m wavelength. By contrast, arsenate isomorphs of KTP do not display this disadvantage and are transparent further into the infrared. Conventional nonlinear materials such as KTP and KTA rely upon their inherent birefringence to allow phase-matching at specific wavelengths which are defined by the material refractive indices. As a result, the phase-matching wavelengths are pre-defined by the material properties.

In contrast, periodically-poled materials may be fabricated to provide phase-matching at any given wavelength combination allowed by energy conservation. Furthermore periodically-poled materials allow the parametric interaction to occur using the largest nonlinear coefficient of the non-linear material ($d_{33}=27$ pm/V, for $LiNbO_3$) thereby resulting in very low oscillation thresholds (as low as 5 $\mu$J). PPLN is just one of many materials which may use the quasi-phase-matching technique. Crystals including RTA ($d_{33}=16.7$ pm/V) and KTP ($d_{33}$=18.5 pm/V) have also been periodically poled and are available QPM materials. These materials correspond to different embodiments for the present invention.

Advantageously, the QPM-OPO materials (i.e., PPLN, PPRTA) of the present invention, have lower thresholds, higher conversion, and provide a much broader tuning when a tunable pump is utilized. The performance of the QPM-OPO materials is considerably superior to the bulk materials. Furthermore, PPLN and PPRTA are commercially available. When using PPLN, the non-linear crystal may be heated to about 100° C. to avoid photo refractive damage and provide wavelength tuning.

3 Diode Pumped Solid State (DPSS) Laser

A theoretical understanding of the energy threshold for IR MALDI has not been established clearly yet. However, power density for conducting IR-MALDI experiments are estimated to be on the order of ~0.4 J/cm$^2$ (10$^6$ W/cm$^2$). By taking reasonable values for the transmission through the interface optics and the conversion efficiencies of the OPO, a pump laser output energy of 5 mJ is estimated. With a pump energy of 5 mJ, an energy of 0.4 mJ can be delivered to the sample with a PPLN OPO crystal (for which a 10% pump to mid-IR conversion efficiency is assumed). This level of energy is demonstrated to be more than adequate for MALDI since the energy density, when the beam is focused on a spot size of ~100 μm, is 5 J/cm$^2$.

Diode pumped solid-state lasers have advantages over flash-lamp pumped lasers. Some of these advantages are derived from the monochromaticity and spatial coherence of the diode source which result in high conversion efficiency, reduced heat load, and good mode match between the pump region and laser mode volume. The compactness, long life and maintenance-free operation of the diode pumping used in the present invention provides a valuable advantage over the prior art systems.

4. Diode Pumped Yb:YAG Laser

The inventors of the present invention have determined that Yb:YAG is well suited for the DPSS laser of the present invention. The ability of Yb to be doped into YAG, YLF, etc, the thermo-mechanical properties of the garnet host YAG, and the broad pump bands associated with it, are some of the considerations that make Yb:YAG a desirable choice. Table 1 lists the spectroscopic and thermo-mechanical properties of Yb:YAG.

TABLE 1

Properties of some solid-state laser materials.

| Laser Material | Yb:YAG | Cr:LiSAF | Ti-Sapp | Nd:YAG |
|---|---|---|---|---|
| Tuning Range, nm | 1020–1070 | 760–1010 | 660–1150 | 1062 |
| Peak Abs wavelength nm and (band width) | 941 (18), 968 (4) | ~630 broad | ~500 broad | 808 (3) |
| Peak Emission Cross Section, σ (10$^{-20}$ cm$^2$) | 2.3 (effective) | 4.8 | 30 | 34 |
| Fluorescence Peak Wavelength (nm) | 1030 | 830 | 790 | 1062 |
| Upper State Lifetime $\tau_f$, (μs) | 951 | 67 | 3.2 | 230 |
| $K_{ic}$, Fracture Toughness, MPa m$^{1/2}$ | 1.4 | 0.4 | 1.7 | 1.4 |
| κ, Thermal Conductivity, W/m° C. | 10 to 13 | 3.09 ∥c 2.9 ⊥c | 46 | 13 |

For pumping Yb:YAG, the absorption line at 941 nm is about five times broader than the 808 nm absorption line in Nd:YAG. The broader bandwidth provides an increased efficiency in diode pumping. The line at 968 nm can also be utilized. CW and quasi-cw high power InGaAs laser diode bar arrays operating at 940 and 968 nm wavelengths are available commercially (CW powers 60 W/cm diode bars, from Opto Power, Inc). Furthermore, the commercial laser diode bar arrays are robust, with operational lifetimes of ~10,000 hours, and have good efficiency.

By end-pumping a relatively long Yb:YAG rod (0.5% Yb) with 1700 W from a stack of diode arrays emitting at 940 nm, a cw output of 434 W can be obtained for an optical conversion efficiency greater than 27%. A shorted rod (0.4 mm thick) can be used with a higher concentration (20% Yb) to obtain 255 W for a pump power of 518 W. By Q-switching the same laser, 22.6 mJ pulses of 26 ns duration can be obtained at a 10 kHz repetition rate. High power, TEM$_{00}$, single frequency output can also be obtained for output powers as high as 35 W for a 135 W pump. More than 100 W cw output can be obtained from a thin disc (0.4 mm thick) when pumped with 250 W power at 940 nm, resulting in a wall plug efficiency of over 15%.

Figure 2:
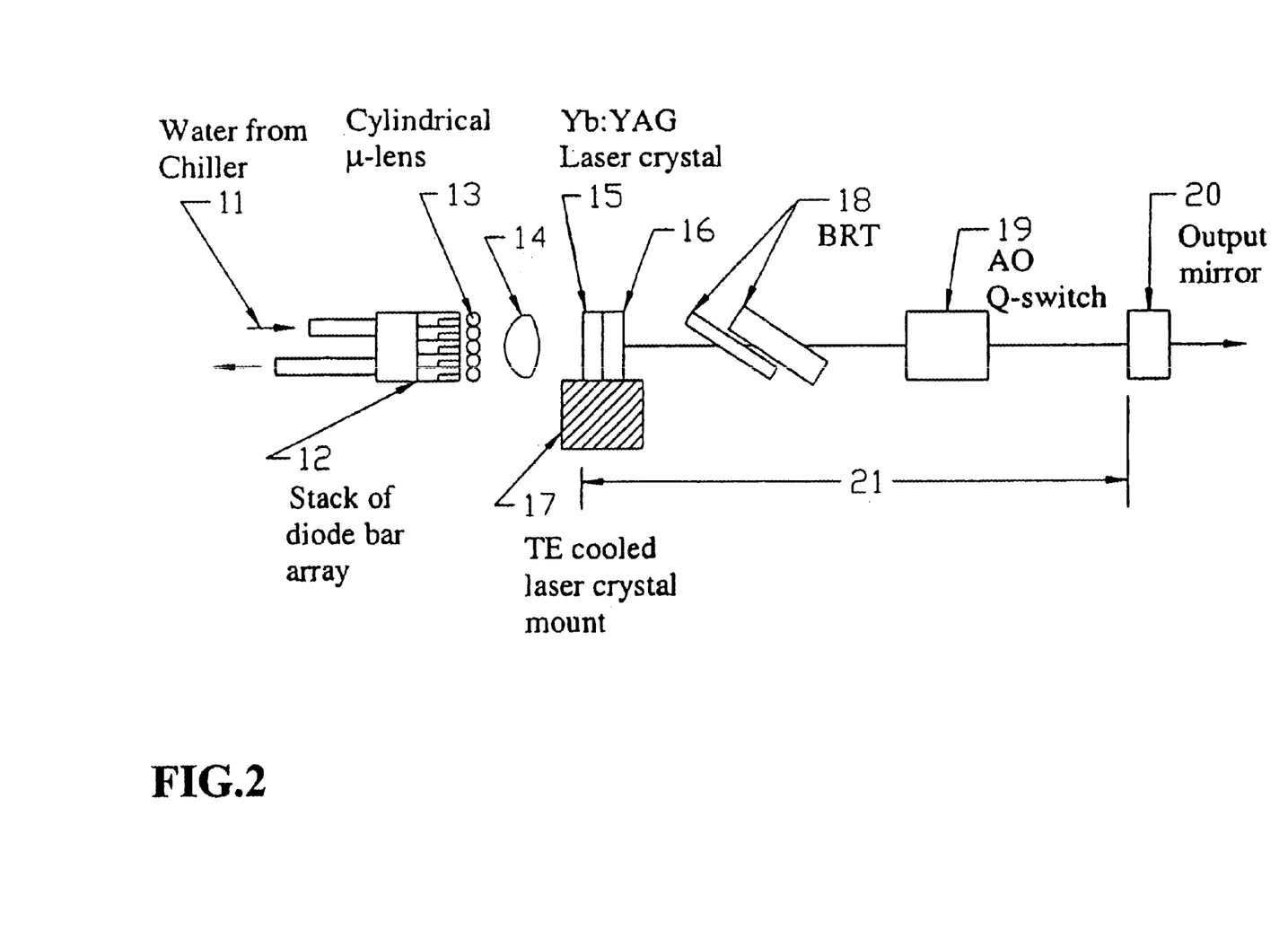
FIG. 2 is a schematic illustration of a diode-pumped Yb:YAG laser employing birefringent tuner for wavelength tuning.

FIG. 2 discloses the layout of the laser resonator and the compact end-pumping optical design of the present invention utilizing a Yb:YAG laser. An aspheric lens 14 collects and focuses the diode output on a dichroic coated face 15 (HR>99%@1030 nm, HT>80%@946 nm) of a 3×3×1 mm Yb:YAG crystal 16 (15% Yb). A second face of the crystal is antireflection coated (reflection<0.2%@1030 nm). The crystal is placed in a thermo-electrically cooled crystal holder 17.

Figure 3:
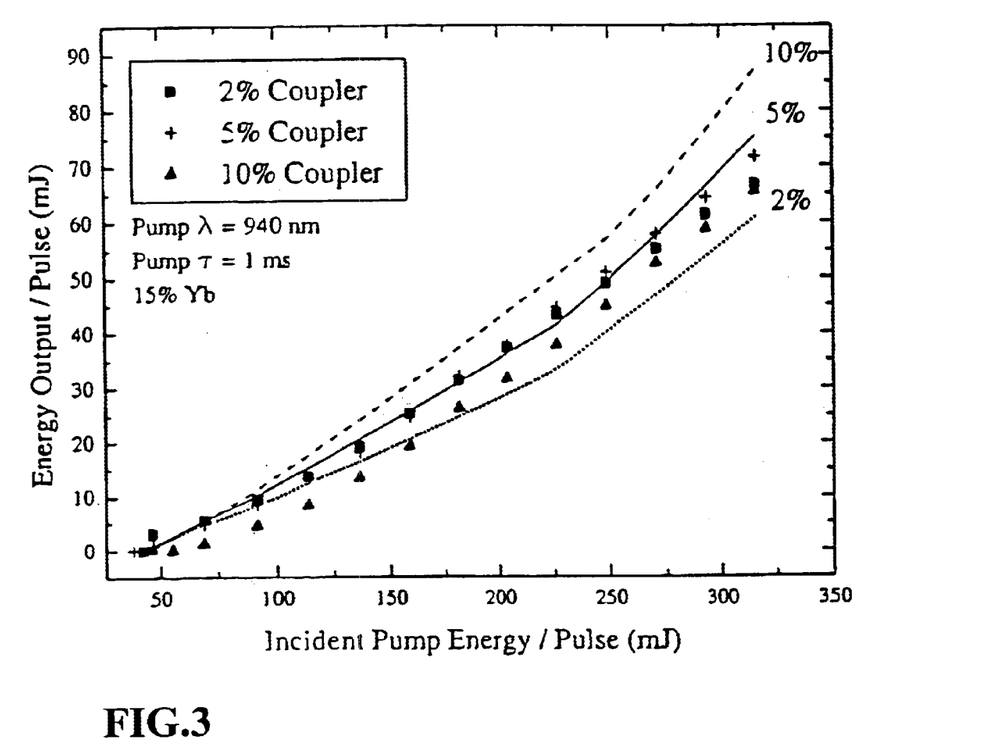
FIG. 3 is a plot of experimental performance of a laser according to the present invention, i.e., a Yb:YAG laser end-pumped by a 940 nm diode bar stack in long pulse mode. Experimental results (symbols) are compared with predicted performance (dashed, solid and dotted lines) for T=10%, 5% and 2%.

A flat parallel laser cavity 21 is formed with the dichroic coated (HR>99%@1030 nm, HT>80%@946 nm) face of crystal 15 as one mirror and a flat output coupling mirror 20. A birefringent controller, or birefringent tuner, 18 inside the cavity fast tunes the laser. As noted above, the birefringent controller 18 can include a quartz plate mounted on a mechanical rotator driven by a motorized stage which is controlled by a controller. The built in encoder device recognizes the rotation position of the motor and thus the precise position of the quartz plate. The rotation of the quartz plate changes the optical axis inside the laser cavity and thus varies the birefringence within the laser cavity. The plate rotation can be controlled by hand, or by computer control so as to effectively control or tune the laser. Output couplers with higher transmittances (T=2%, 5%, and 10% at 1060 nm) were tested. The performance of the Yb:YAG laser with the different output couplers is shown in FIG. 3. For a pump energy of 311 mJ (corresponding to a diode current of 80 A and 1 ms pump duration) about 72 mJ output at 1030 nm was obtained in long pulse with T=2% mirror and the slope efficiency was about 27%. For the T=10% mirror, the output (66 mJ) and slope efficiency (25.5%) were both slightly lower. For the T=10% case, the performance is expected to improve when the pump power is increased. FIG. 3 also shows the results of a simulation from an analytical model which are in good agreement with the experimental results, hence confirming the validity of the model used.

Figure 4:
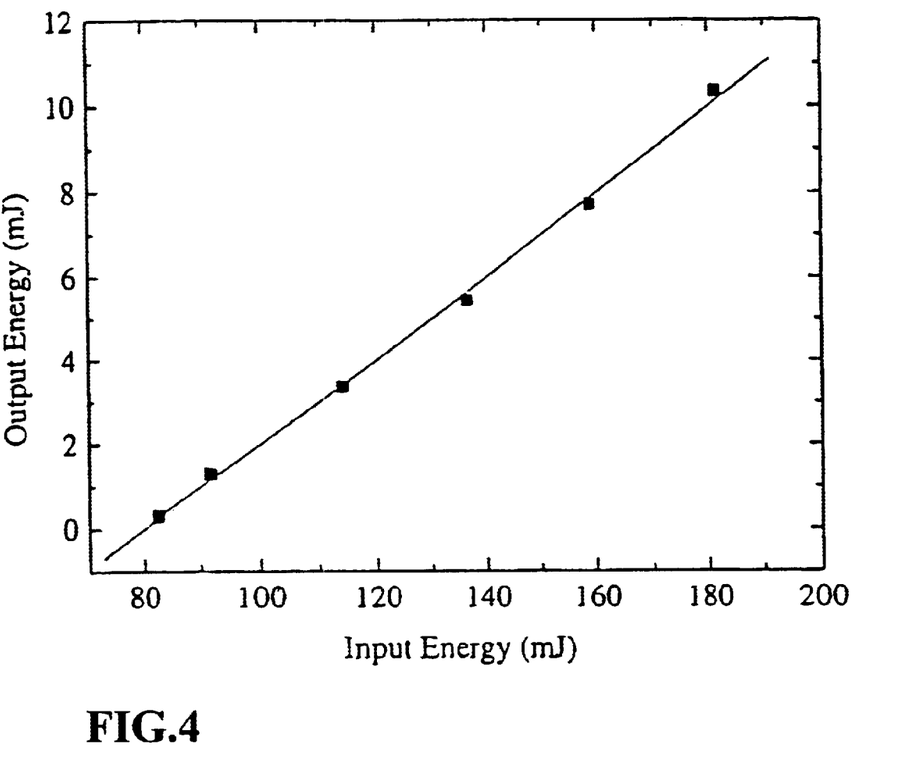
FIG. 4 illustrates a Q-switched output performance of the diode-pumped Yb:YAG laser of the present invention as a function of incident pump energy, with an output coupler T=10%, and an incident energy threshold=97 mJ.

For Q-switching the laser, a fused silica acousto-optic Q-switch 19 (manufactured by IntraAction Corp) controlled with a driver can be utilized. This plano-plano A-O modulator 19 is AR coated and the insertion loss is under 0.5%. Good Q-switching performance can be obtained with different output couplers (ranging from 2–11% transmittance). FIG. 4 shows the input-output performance of the Q-switched laser with the 10% transmitter mirror. The slope efficiency of the output as a function of incident energy is about 8%. In this particular example, the efficiency was relatively low because:

1) the coating was damaged (before damage the output energy was almost double);
2) only about 65% of the pump was absorbed; and
3) the output coupler was not optimal. The efficiency can be improved to 30% with proper coatings and optimization of the dopant level and output coupler.

As noted above, the laser cavity 21 can include birefringent tuner 18 that may include an electronically controlled motorized rotator configured to rotate a quartz plate thereby changing the optical axis and the birefringence within the laser cavity 21.

5. Design of the Diode Pump Yb:YAG Laser

The pump energy required to obtain an OPO idler output of ~10 mJ/pulse can be estimated with experimental data measured from the PPLN and PPRTA OPO crystals. For example, the energy threshold for the OPO to oscillate is approximately 0.68 mJ for a 20 mm long PPLN crystal or 1.1 mJ for a 15 mm long PPRTA crystal (beam waist=0.9 mm). A very low threshold of 300 µJ was measured in a PPLN crystal with 30 µm poling period (beam waist=0.4 mm, the beam waist being the minimum diameter of the laser beam at focused point). Including losses arising from the coupling optics such as for example, losses focusing lenses, mirrors, and isolators and losses from a non-uniform intensity distribution in the pump beam, etc., it is estimated that a pump energy per pulse of about 2 mJ or greater is required for reaching the energy threshold. Again, taking an average conversion efficiency 10–12% for tunable narrow line-width OPO, the pump laser energy required is estimated to be about 60–70 mJ/pulse. Table 2 shows the baseline specification for a diode pumped Yb:YAG laser.

TABLE 2

Baseline Specifications for Tunable Laser Transmitter for chemical emission detection.

| Q-switched Yb:YAG Laser for Pumping OPO | |
|---|---|
| Pump Laser Diode Arrays | InGaAs, 941 nm |
| Pump Diode Power | 4 × 150 W array stacks |
| Yb:YAG Laser crystal | 1.6 × 3 × 5 mm |
| Yb Dopant Concentration | 5–10 atomic % |
| Output Energy | <100 mJ |
| Repetition Rate | 1000 Hz |
| Pulse Duration | 30–40 ns |
| Output Wavelength | 1020 to 1065 nm |
| Output Line width | <.05 nm |
| Pump Tuned Mid-IR PPRTA OPO | |
| Idler Output Energy | 10 mJ |
| Signal wavelength Range | 1.45 to 1.95 µm |
| Idler wavelength Range | 2.3 to 5 µm |

As seen from the laser requirement, an average output power of about 60–70 mJ in Q-switched output is needed. About 600 W of pump power is needed in this particular example. End-pumping with laser diodes is convenient and is a simple pump geometry. An upper limit to the scaling up of pump power input occurs when the thermal stresses are large enough to lead to the crystal fracture. Crystal fracture is caused by the temperature gradients set up in the crystal 15 by the absorbed energy and occurs when the temperature of the pumped region exceeds 70° C. This is especially important because Yb:YAG is a quasi-three level material, wherein any increase in the crystal temperature causes increased population in the terminal laser level with a resultant reduction in performance. Any increase in temperature will lead to a depletion of the $^2F_{7/2}$ ground state population (see Table 3 below). In turn, this depletion causes a decrease in absorption of the crystal implying that a higher pump power is required for the same output. The higher pump requirement will lead to higher thermal loads inside the laser crystal.

TABLE 3

Boltzman population of the $^2F_{7/2}$ Ground State Stark Levels of $Yb^{3+}$ at various temperatures.

| $^2F_{7/2}$ Ground State Stark Levels | 300 K | 400 K | 500 K | 600 K |
|---|---|---|---|---|
| Energy Level 3 | 0.020 | 0.046 | 0.070 | 0.093 |
| Energy Level 2 | 0.046 | 0.084 | 0.117 | 0.14 |
| Energy Level 1 | 0.058 | 0.10 | 0.133 | 0.157 |
| Energy level 0 | 0.876 | 0.77 | 0.68 | 0.61 |

The present invention overcomes these limitations by using following design considerations:

1) Limit the maximum temperature attained in the crystal due to absorption of the pump power to below 70° C. In the present invention, this is performed by using thermal-electric cooler 17 to active control and cool the laser crystal.

2) Obtain a good overlap between the pump region and the laser mode volume so as to utilize the entire pump power effectively. For example, 80% of the pump energy can be deposited into the laser mode volume.

3) Choose a laser rod geometry and dopant concentration based on the above two points, to limit the temperature rise and to obtain maximum overlap. For example, a 2 mm long rod having a 3 mm diameter and a Yb 15% dopant concentration.

4) Use a high fluence pump laser to limit the pumped volume in the crystal, which allows the use of smaller laser mode volume, permitting high conversion efficiency and reduced heating. For example, a fluence on the order of 2.5 kW/cm².

Figure 5:
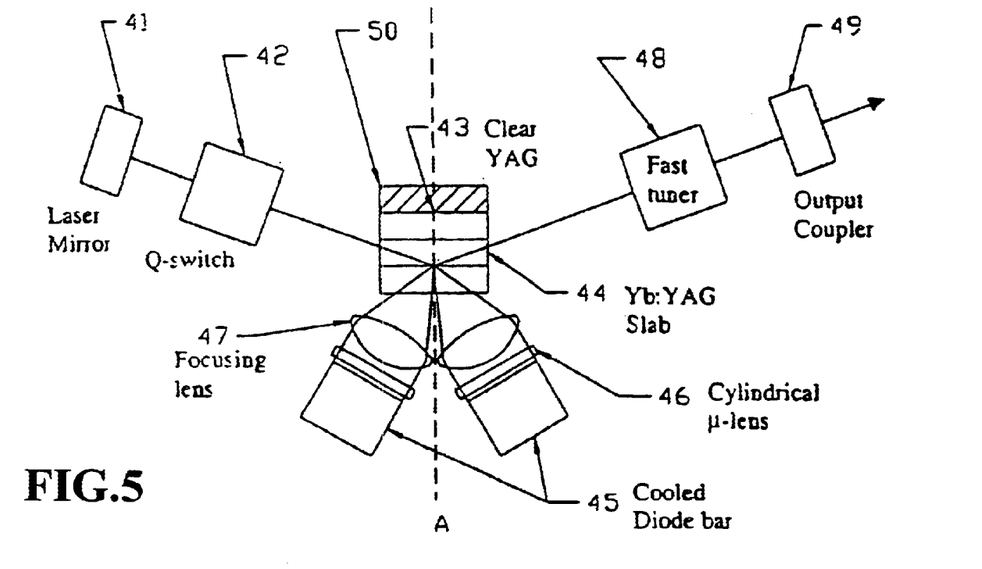
FIG. 5 is a schematic illustration of a diode-pumped Yb:YAG laser of the present invention, with total internal reflection resonator and side-pump geometry.
Figure 6:
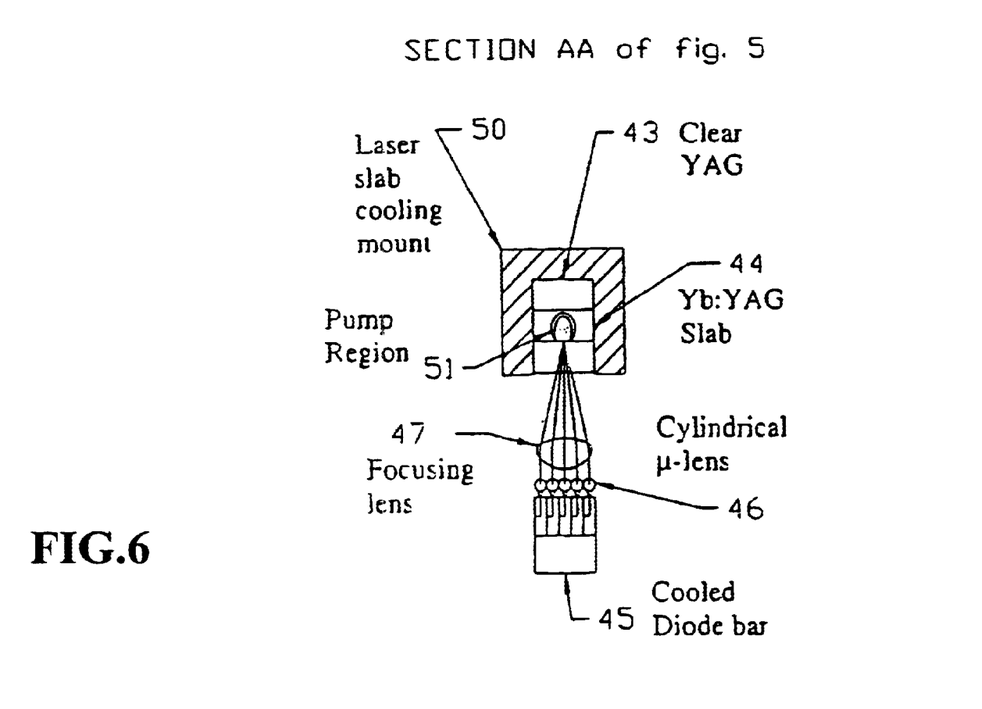
FIG. 6 is a more detailed embodiment based upon the embodiment of FIG. 5 in the AA section. The overlap between pump absorption and laser mode region is shown in the shadow area.

The Yb:YAG crystal is pumped by a stack of diode array bars 12. The pump source can include a commercially available, three bar stacks of 1 cm long InGaAs, 941 nm diode arrays, each capable of providing 100 W cw power at 941 nm (manufactured by Optopower Corp, Inc.). Although these diode arrays have a high power capability, such an extended source cannot be focused or a beam formed directly to provide a circular beam of sufficient quality to end pump Yb:YAG. The pump geometry and resonator can utilize the extended source to scale up the output power effectively. A side pumped geometry, as shown in FIGS. 5 and 6, and a simple total internal reflection laser resonator can be utilized for scaling up the energy. Specifically, an internal reflection refers to a cavity mode TIR at the point in the laser crystal where the diode pump is applied. Such a geometry is a simple way of scaling up the pump energy and to efficiently extract the stored energy without serious thermal roll off in previous lasers.

FIGS. 5 and 6 show another embodiment of the tunable high spectral purity laser according to the present invention wherein the laser crystal is side pumped. Good output performance and maximum efficiency occur by ensuring maximum overlap between the gain regions in the laser rods 44 and the laser mode volume 51. The pump source includes a conductively cooled laser diode stack array 45. A microlens 46 attached to each individual diode array to condition the output allowing the diode light to emerge with a far field 1/e divergence of ~3° in a fast axis direction. The divergence in the slow axis direction is ~10°. A fast (NA=0.4) aspheric lens 47 (f=12.0 mm) collects the pump light and focuses the entire diode output to an elliptic region of approximately 1.6 mm×5 mm on the side of the Yb:YAG slab 44 that is AR coated for 941 nm pump. Yb dopant concentration (~5–10%) is chosen so as to achieve good pump absorption within 3 mm of the surface, such that a pump absorption region 5 mm (x direction)×1.6 mm (y)×3 mm (z) is obtained. A good overlap between the pump absorption region and the laser mode is obtained by arranging a near grazing angle (<10°) incidence of the laser mode with the laser crystal. For this situation the overlap is computed to be nearly 80%. The pump power is distributed over a sufficiently large area so as to keep the peak temperature rise at the center of the pump region below 70° C. above which thermal roll-off becomes large.

The laser slab temperature can be controlled via a cooling mount 50. The laser can further include a fast tuner 48, an output coupler 49, a laser mirror 41 and a Q-switch 42. The fast tuner 48 can be a birefringent controller wherein a quartz plate is mounted on a mechanical rotator driven by a motor which is controlled by a controller (for example, a Motorized linear translation stage from National Aperture, Inc.). The built in encoder device recognizes the position of the motor and thus the precise position of the quartz plate. The rotation of the quartz plate changes the optical axis inside the laser cavity and thus varies the birefringence within the laser cavity. The plate rotation can be controlled by hand, or by computer control so as to effectively control or tune the laser.

In this system, the two laser crystal 44 faces are polished and optically contacted (diffusion bonded) with clear undoped YAG blocks 43. This arrangement facilitates heat removal from the Yb:YAG and also removes the necessity of providing a coating directly on the surface where the pump energy is absorbed. One exposed face of the three stack composite crystal facing the pump laser is provided with an AR coating@941 nm, while the other face is provided with an AR coating @1030 nm. With a single 10 bar stack 45, 600W of pump power is available for pumping the crystal. Assuming a 10% quantum deficit heating, the Yb:YAG heat load is ~72 W. At this pump power, the cooling needs can be met with a small closed circuit fluid recirculator (−20° C.) which can transfer the heat from the laser crystal to an air-cooled heat spreader. A thermal model of the Yb:YAG crystal was used to determine the temperature distribution within the crystal, which yielded a maximum heat load of 70° C. at the center of the crystal. Water cooling with a closed system circulating chiller can be utilized for removing heat from the laser diode array stack 45.

6. Design of the Compact Widely Tuned OPO

Figure 7:
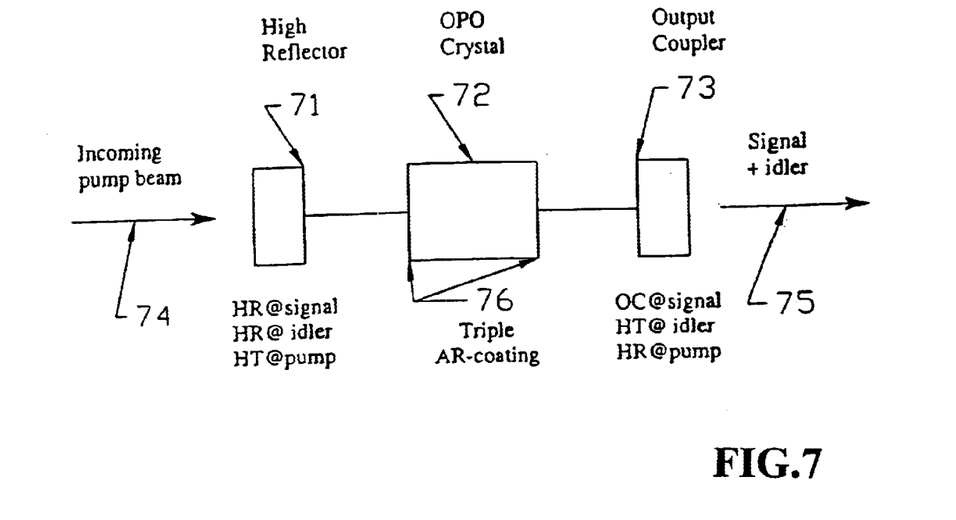
FIG. 7 is a schematic illustration of a QPM OPO cavity according to the present invention.
Figure 8:
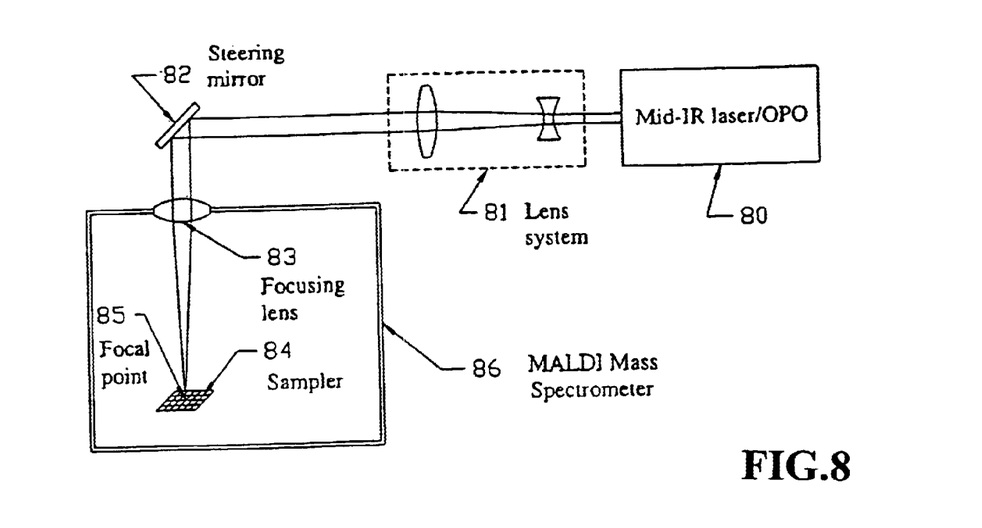
FIG. 8 is a schematic illustration of a laser beam delivery layout of a MALDI-MS system according to another embodiment of the present invention.

FIG. 7 discloses an embodiment of the OPO for the present invention. It is a singular resonant optical parametric oscillator with an OPO crystal 72 pumped by the DPSS laser output 74 to produce near-IR signal and mid-IR idler beams 75 in the wavelength region from 2 to 5 $\mu$m with pulse energy greater than or equal to 1 mJ/pulse. Advantageously, OPO crystal 72 does not have to be rotated, nor heated to tune the output optical beam. Thus, a non-heated, non-linear crystal can be used thereby increasing the simplicity, the reliability and the compactness of the system.

In the present invention, OPO crystal 72 can be a multiple grating periodically poled Lithium Niobate (PPLN), Potassium Titanyl Arsenate (PPRTA), or Potassium Titanyl Phosphate (PPKTP). The broad band wavelength tuning is achieved by linearly translating crystal gratings to the IR pump beam inside the OPO resonator. Due to the fact that different gratings correspond to different phase-matching, thus, different mid-IR output, broadly tuning in 2–5 $\mu$m is achieved. OPO crystal is attached on a motorized linear translation stage which is further controlled by an electronic controller. The crystal position can be identified and controlled by a built in encoder and an electronic servo loop (for example, a linear translation stage from National Aperture, Inc.).

A cavity is formed by two plane mirrors 71 and 73, and the OPO crystal 72 is coated with an antireflection coating 76. High energy capability, high conversion efficiency, extreme simplicity and robustness are emphasized in the design of the OPO of the present invention.

For PPLN OPO 72 pumped by a diode-pumped Cr:LiSAF, a threshold pump energy of ~100 $\mu$J was demonstrated for 250 ns long pulses. Significant increase of the conversion efficiency and reduction in OPO threshold is obtained by the improvements listed below:

1) Longer OPO crystal: Doubling the crystal length from 10 mm to 20 mm reduces threshold by a factor of four.

2) Antireflection (AR) coatings on the OPO crystal: Since refractive indices of KTA (n=1.8) and PPLN (n=2.2) are high, considerable Fresnel reflection losses occur in the uncoated crystal surfaces both for the pump and the intra cavity signal and idler waves. Reducing these losses will further reduce the threshold by a factor of 2.

3) Improved Mirror Coatings: Using higher quality coatings on cavity mirrors. For example, the reflectance can be 99.8% at the resonance frequency. Adopting pump reflection schemes reduces the threshold by a further factor of 4 and increase the output of the useful mid-IR.

4) Mode Matching: Better mode matching for the DPSS laser beam pump and the desired OPO mode to further minimize the threshold, for example, by selecting mode matching lenses. For a hemispherical resonator, the optimum pump focal spot diameter is ~52 $\mu$m, which is much smaller than the estimated 200 $\mu$m focusing that is conventionally used. Therefore, a smaller focal spot size consistent with the maximum allowable fluence determined by optical damage can be utilized.

5) A pulse length of the DPSS laser longer than that of the flashlamp-pumped system, in the range of 200 to 300 ns, increases the threshold. The inventors of the present invention found a factor of 5 improvement, i.e., a decrease, in threshold (~0.7 mJ) when a 5 ns pump was used instead of the 80 ns pump.

Several OPO cavity designs can be implemented in the present invention. Although the two plane mirror cavity configuration shown in FIG. 7 is convenient, other configurations such as a hemispherical, or a spherical resonator have advantages of moving the pump focus away from the vulnerable front surface. The radii of curvature for mirrors are chosen to obtain proper mode-matching with the pump beam. Also, non-linear crystal 72 may have a hemispheric shape.

Table 4 shows parameters for two examples of OPO's using KTA and PPLN crystals according to the present invention.

TABLE 4

Parameters of KTA, PPLN OPOs

| Material | KTA | PPLN |
|---|---|---|
| Crystal cut | x-cut | z-cut |
| Pump Pulse duration (ns) | 100 | 100 |
| Pump beam waist (μm) | 100 | 100 |
| Signal beam waist (μm) | 120 | 120 |
| Mirror Reflectivity @ signal | 90% | 90% |
| Crystal length (mm) | 20 | 20 |
| OPO Cavity length (mm) | 35 | 35 |
| Nonlinear coefficient (pm/V) | 3.7 | 18 |
| Calculated threshold (μj) | 220 | 22 |

7. IR Laser Interface Optics

FIGS. 8–11 show several optics interfaces according the present invention for the MALDI applications. A mid-IR laser/OPO device as disclosed above produces an IR beam that is focused to a focal point 85 (95, 104) on a sampler 84 (94, 105) where a biological sample is placed. The sampler 84 (94, 105) is placed in a MALDI mass spectrometer 86. The mass spectrometer 86 can be a miniaturized endcap reflectron time-of-flight mass spectrometer (wich corresponds to a special mass spectrometer design known to those skilled in the art).

One important aspect of the MALDI process is the laser power density at the sample position. Effective enhancement of the power density is achieved by properly focusing the laser beam at the sample position by interface optics. In other words, an optical device that directs the infrared laser pulses to the sample can be configured to vary the power density of the infrared laser pulses at the sample location. Such optical device can include infrared lenses 81, 83, 103, or 106 and steering mirrors 82 or 102 that direct the laser beam to the focal point 85 (95, 104). For example, in the embodiment shown in FIG. 8, a first lens system 81 (with positive or negative lenses) in front of the laser collimates the output laser beam and a second lens 83 (positive) focuses the beam onto the sampler 84. By adjusting the separation distance, the focal spot at the sample position can be varied for the optimum power density. The interface optics assembly can be positioned on top of a window of the mass spectrometer, such as window 107 shown in FIG. 11. The control of the relative distance between the lenses and the distance of the assembly relative to the sample position provides variability of the final focal spot size of the laser beam at the sample position.

Figure 9:
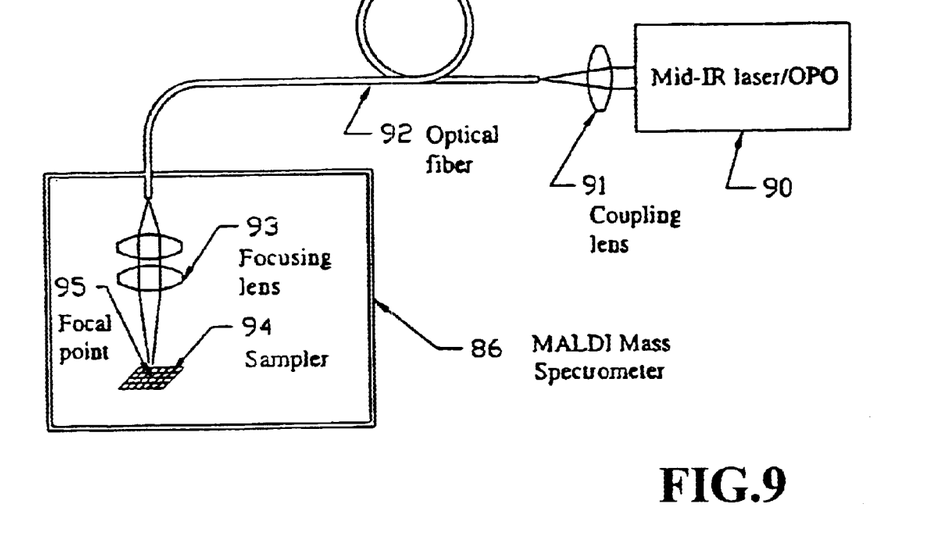
FIG. 9 is a schematic illustration of an optical fiber laser beam delivery layout of a MALDI-MS system according to another embodiment of the present invention.

An alternative design shown in FIG. 9 is equally applicable using a low numerical aperture (<0.2) infrared optical fiber 92 and a single element focal lens 93 at the end of the fiber that will be located very close to the sample holder 94. The nominal vignetting by this focal assembly in front of the sample is not a serious interference in the electric field configuration of the reflector due to the dielectric material property of the optical elements and the small volume of the assembly. The infrared fiber assembly interface optics provides a significant convenience in optical alignment and effective delivery of the laser power on to the sample with maximum stability.

Figure 10:
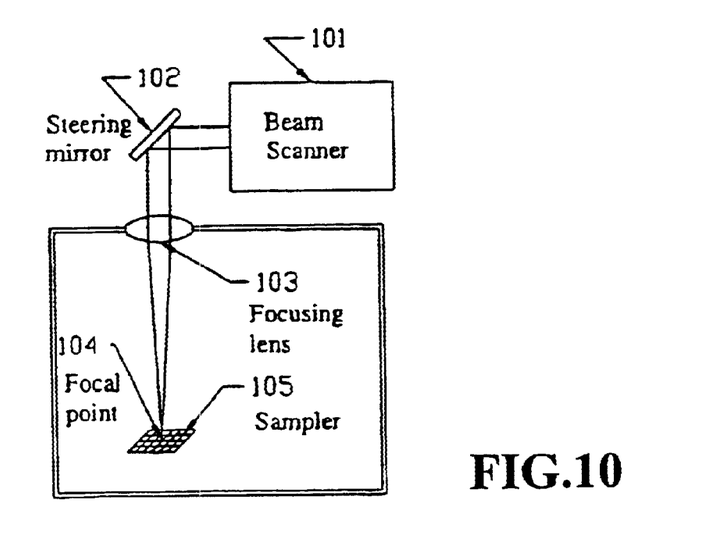
FIG. 10 is a schematic illustration of an optical scanning configuration for a MALDI-MS system according to another embodiment of the present invention.
Figure 11:
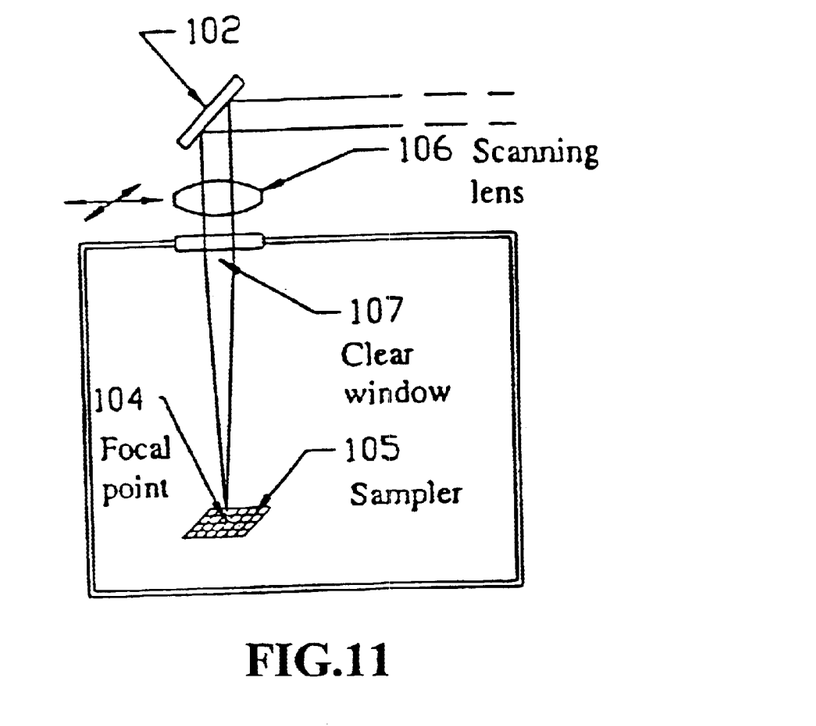
FIG. 11 is a schematic illustration of an optical scanning configuration for a MALDI-MS system according to another embodiment of the present invention.

Advantageously, the infrared beam can be scanned with a rapid optical scanning device configured to scan for large throughput MALDI operation without moving the sample holders. For example, as shown in FIG. 10, the infrared beam can be scanned with beam scanner 101, reflected by a steering mirror 102, and focused with a focusing lens 103 onto a focal point 104 located on a sampler 105. Alternatively and as shown in FIG. 11, the infrared beam can be reflected by steering mirror 102, scanned using a scanning and focusing lens 106, and introduced into the mass spectrometer 86 through a clear window 107.

An operator of the MALDI system according to the present invention can adjust the laser operation using a high resolution camera and a feedback control, the camera enabling the operator to verify the sharp focus and pointing of the output infrared laser pulses.

The inventors of the present invention have recently investigated IR MALDI and have shown that using of an endcap reflectron geometry, choosing a proper matrix, improving sample preparation and cooling of the sample will increase the sensitivity and achieve close to an order of magnitude improvement in mass resolution.

Figure 12:
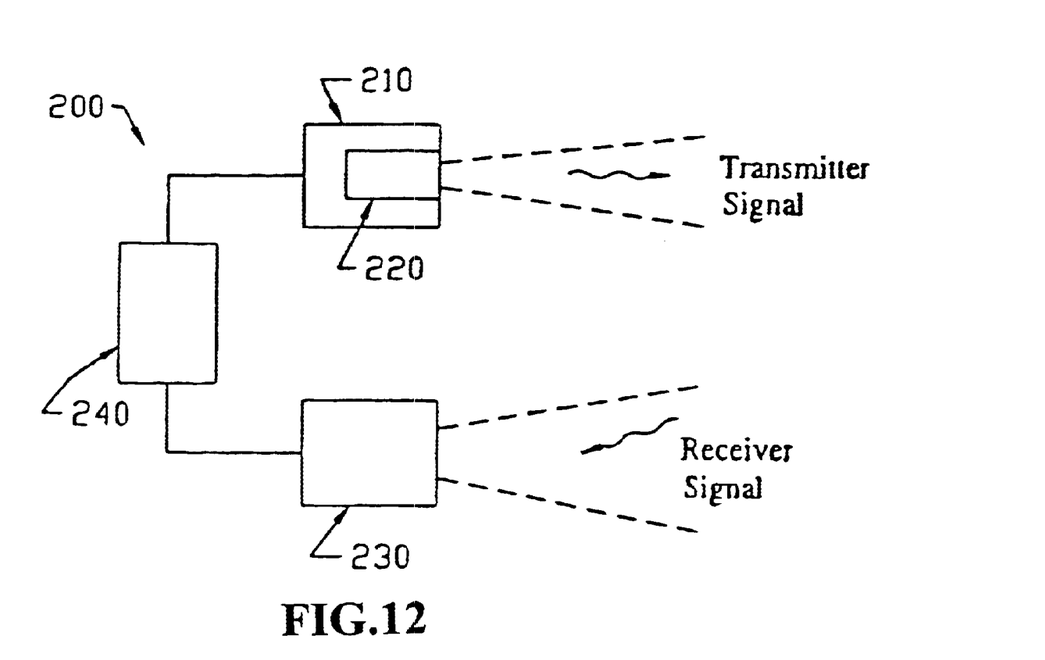
FIG. 12 is a schematic illustration of a light detection and ranging (LIDAR) system employing a tunable mid-IR source as transmitter according to another embodiment of the present invention.

Even more exciting is the possibility offered by the present invention of utilizing natural matrices such as water ice and electrophoresis gels when a laser, widely tunable in the infrared, is utilized for IR MALDI Advantageously, the tunable high spectral purity laser according to the present invention can be integrated into a Light Detection And Ranging (LIDAR) system, which provides laser-based remote sensing for measuring environment parameters. Examples of LIDAR system are disclosed in U.S. Pat. Nos. 5,914,776 and 5,889,490, the entire contents of which are hereby incorporated by reference. As shown in FIG. 12, the LIDAR system 200 according to the present invention includes a transmitter 210 having a tunable laser source 220, a receiver 230 to collect the backscattered radiation, and a processor 240 connected to the receiver for analyzing a signal received. The processor 240 can be connected to the transmitter 210 and the receiver 230 for timing of emitted pulses. The LIDAR transmitter 210 of the present invention includes the tunable laser source 220 described above and shown in FIGS. 1–2 and 5–7. The receiver 230 and the processor 240 are well known to those of ordinary skill in the art.

Numerous additional modifications and variations of the present invention are possible in light of the above teachings. It is therefore to be understood that within the scope of the appended claims, the present invention may be practiced otherwise than as specifically described therein.

What is claimed as new and desired to be secured by Letters Patents of the United States is:

1. A method for performing matrix assisted laser desorption/ionization mass spectroscopy, comprising the steps of:

supplying a near-infrared light;

generating from said near-infrared light a pulsed, variable frequency pump wave;

converting in an optical parametric oscillator cavity said pulsed, variable frequency pump wave to infrared laser pulses in a spectral range of about 2–5 μm;

directing said infrared laser pulses from the optical parametric oscillator cavity to a sample in a matrix material conducive to laser desorption;

desorbing sample molecules from said sample; and collecting said desorbed molecules for mass spectroscopic analysis, wherein said step of generating said variable frequency pump wave includes, emitting a near-infrared light from at least one diode bar array containing at least one infrared light-emitting diode, collimating said near-infrared light with a cylindrical micro-lens assembly providing a micro-lens for each said light-emitting diode, focusing with a focusing objective the collimated near-infrared light onto a doped laser crystal inside a laser cavity, thereby stimulating emission of an intermediate pump wave light having a frequency, controlling said frequency with an electronically controlled birefringence tuner which adjusts an optical axis in the laser cavity, switching with a Q-switch the laser cavity to generate from said intermediate pump wave light said pulsed, variable frequency pump wave, and outputting said pulsed, variable frequency pump wave.

2. The method of claim 1, further comprising the step of:

beam splitting the output infrared laser pulse into a signal and an idler wave, wherein said signal and idler wave frequencies sum to the frequency of said variable frequency pump wave.

3. The method of claim 1, wherein the step of converting comprises the steps of:

transmitting said pulsed variable frequency pump wave into said optical parametric oscillator;

absorbing said pulsed variable frequency pump wave in a fixed, non-thermally controlled, non-linear crystal;

generating said infrared laser pulses; and outputting said infrared laser pulses from said optical parametric oscillator.

4. The method of claim 1, further comprising the step of focusing said infrared pulses onto said sample.

5. A tunable laser comprising:

an infrared light-emitting source configured to emit a near-infrared light;

a lens assembly configured to collimate said near-infrared light;

a focusing objective configured to focus the collimated near-infrared light;

a laser cavity including,
- a first laser crystal positioned configured to absorb said focused near infrared light and emit an intermediate pump wave light,
- a first laser cavity mirror configured to reflect said intermediate pump wave light,
- a birefringent tuner configured to vary the birefringence within the laser cavity by changing an optical axis within the laser cavity,
- an optical switch configured to optically switch said intermediate pump wave light to produce from said intermediate pump wave light said pulsed near infrared variable frequency pump wave, and
- a second laser cavity mirror configured to reflect said near-infrared light and to transmit a pulsed variable frequency wave;

a second laser crystal configured to receive said pulsed variable frequency wave as a pulsed variable-frequency pump wave;

a quasi-phased matched optical parametric oscillator configured to be pumped by said pulsed variable-frequency pump wave and output infrared laser pulses.

* * * * *